Nov. 5, 1940.     S. J. HOLM     2,220,718
TRAVELING TRAY OVEN
Filed July 13, 1939     2 Sheets-Sheet 1
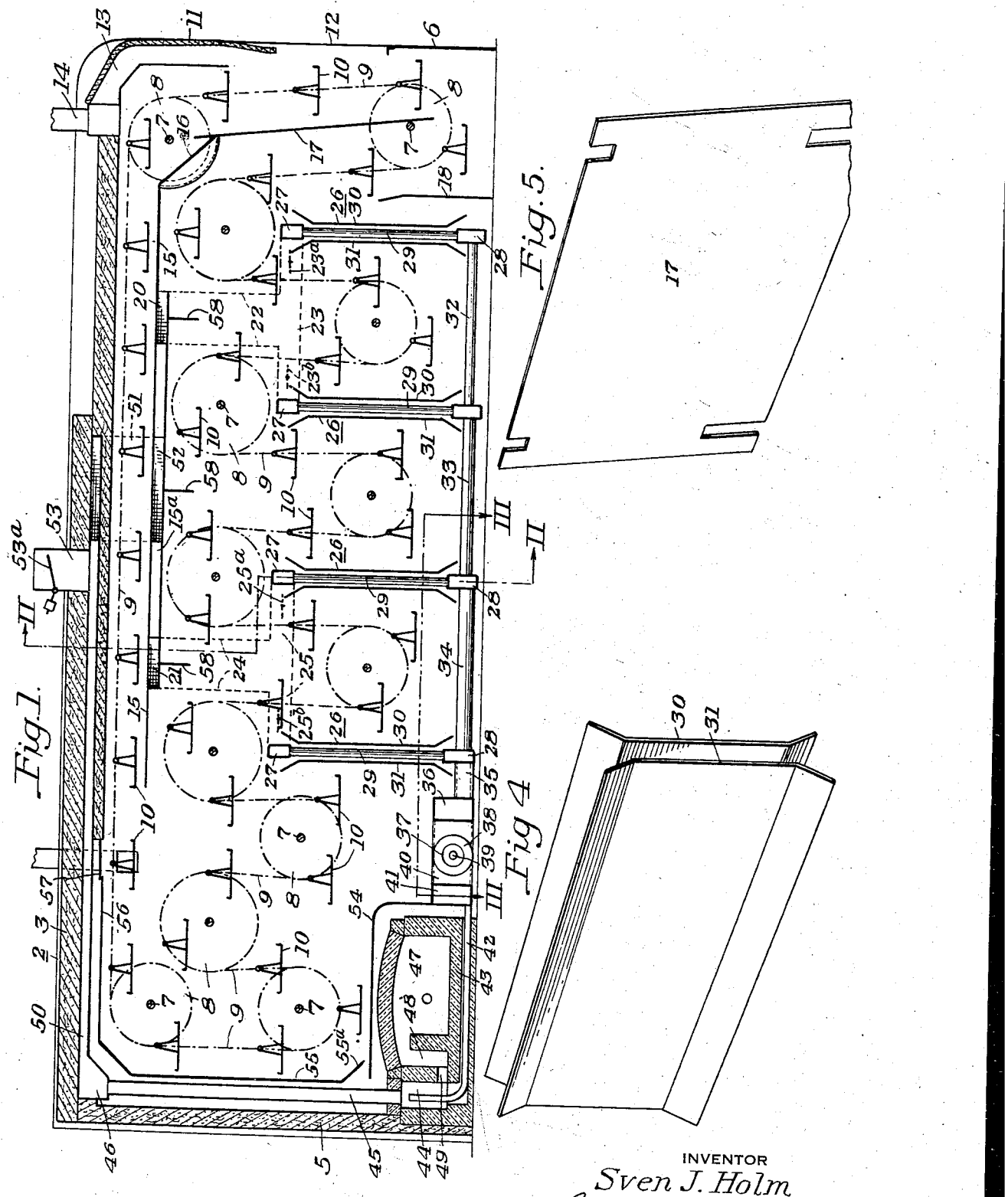
INVENTOR
Sven J. Holm

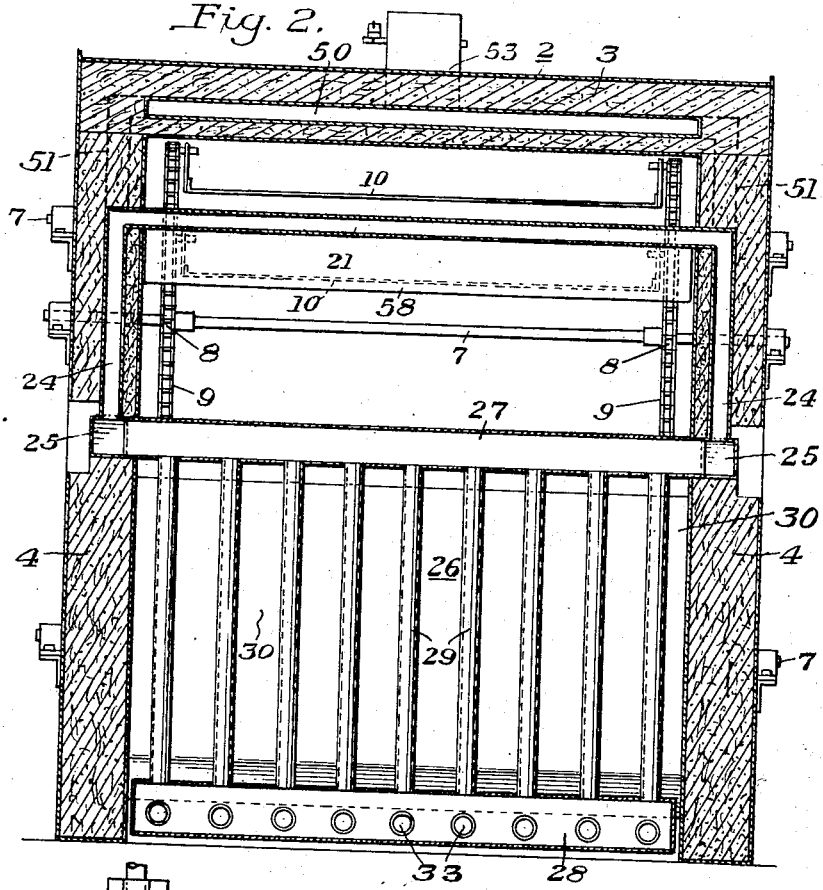
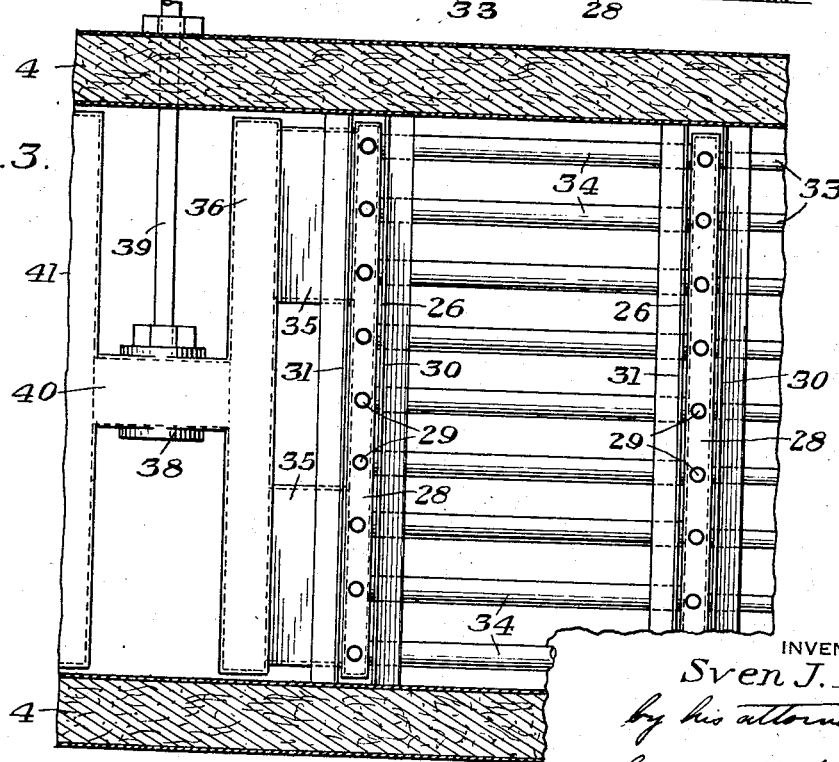

Patented Nov. 5, 1940

2,220,718

UNITED STATES PATENT OFFICE 2,220,718

TRAVELING TRAY OVEN

Sven J. Holm, Wellsville, N. Y., assignor to Haller Oven Company, Pittsburgh, Pa., a corporation of Pennsylvania Application July 13, 1939, Serial No. 284,232

15 Claims. (Cl. 107—57)

This invention relates to ovens of the type wherein there is an endless conveyor from which is suspended a plurality of trays for conveying dough or other material to be baked through an oven chamber, and my invention is for an indirect heating system for such ovens.

The present invention is intended primarily as an improvement in traveling tray ovens of the general type disclosed in patent to F. C. Haller, No. 1,363,781, dated December 28, 1920. As disclosed in the said Haller patent, traveling tray ovens as generally constructed have been directly heated. This requires the use of gas or vaporized oil as a fuel. In the direct heated oven the burners are located in the lower part of the oven, and the gases of combustion circulate through the oven chamber to perform the baking. In many cases it is desirable or necessary to use a fuel other than gas or to burn oil without a vaporizing plant. The use of a fuel other than gas or oil vapor requires an indirect heating system wherein the gases of combustion do not come into contact with the dough or other material being baked. As a matter of fact, even where gas is available, many bakers demand that the oven be indirectly heated. Heretofore attempts have been made to heat traveling ovens indirectly by circulation of hot gases of combustion through heating elements disposed in the oven chamber, but such arrangements have been used principally for ovens wherein the conveyor travels in horizontal flights, and difficulty has been encountered in their use in securing the desired distribution of heat, and in securing satisfactory control of the oven temperature.

The present invention provides a heating system particularly adapted for traveling tray ovens of the type disclosed in said Haller patent wherein the greater portion of the travel of the bread is in an up and down direction. The invention provides a heating system for ovens of this type wherein excessive heating at any one point is avoided and complete diffusion of the heat through the oven space is obtained. My invention may be more readily understood by reference to the acompanying drawings which illustrate one form of oven embodying my invention, together with a heat-circulating system which is more or less conventionally illustrated and in which Figure 1 represents a longitudinal vertical section through an oven embodying my invention;

Figure 2 represents a transverse vertical section in approximately the plane of line II—II of Figure 1;

Figure 3 is a horizontal section showing a portion only of the plate arrangement of the heating apparatus for the oven, the section being in substantially the plane of line III—III of Figure 1;

Figure 4 is a perspective view showing the cross plates that are used in conjunction with the vertical heater units to provide internal flues within the oven; and Figure 5 is a perspective view showing the front baffle plate of the oven.

Referring to the drawings, 2 designates generally a rectangular oven structure substantially similar to that disclosed in the said Haller patent, having the walls thereof formed of insulating material between sheet metal. The top wall of the oven is designated 3. The side walls are designated 4 and the rear end wall is designated 5, and the front wall is designated generally as 6. The oven is provided with a plurality of transverse shafts 7 on which are sprocket wheels 8 over which pass conveyor chains 9. Each shaft carries two sprocket wheels, one at each side of the oven chamber, and there are two chains one at each side of the oven. Trays 10 are pivotally carried between these two chains, the conveyor being of a type commonly used in traveling tray ovens. The sprockets are so arranged that there is a horizontal reach of the conveyor extending from the front of the oven to the back at the top of the oven space. From the back of the oven space the conveyor passes up and down over the sprockets, providing a series of vertical reaches. The last vertical reach is at the extreme front of the oven chamber. In the particular oven illustrated, the front wall 6 of the oven comprises a hood portion 11 below which is an opening 12, and below the opening 12 the wall is closed. The opening 12 gives access to the conveyor so that the pans can be loaded onto, and removed from, the conveyor through this one opening.

There is a flue passage 13 immediately back of the hood 11 through which heated gases can be withdrawn to a stack connection 14 so as to prevent any excess of heat from escaping through the opening 12.

Spaced below the horizontal reach of the conveyor is a sheet metal partition 15 which extends from the foremost sprocket wheel 8 well back into the oven. At the front of the plate 15 is an inclined plate 16 that extends down to a front baffle plate 17, the baffle plate 17 being notched as shown in Figure 5 to accommodate the sprocket wheels. This plate serves to confine the heat of the oven and prevent it from going out through the opening 12. Back of the baffle plate 17 there is a short vertical plate 18 which extends well up into the oven chamber and which prevents the direct escape of heated air from the oven chamber under the baffle plate 17 to the opening 12 and it likewise protects the oven against the infiltration of cold air through the opening 12 under the baffle 17.

Secured to the under side of the plate 15 is a thin flat enclosed box-like structure 15a which extends under a substantial part of the length of the upper reach 9 of the conveyor and which has a width substantially co-extensive with the width of the oven chamber. This structure has outlet openings 20 at its forward end at each side of the oven and other similar openings 21 at each side of the oven at the rear end thereof. The ports 20 communicate with ducts 22 that extend down each side of the oven. At the lower end of each duct 22 is a longitudinally extending duct 23. The ports 21 open into similarly arranged downwardly extending ducts 24 which ducts 24 open into horizontally extending ducts 25, this arrangement being most clearly shown in Figure 2.

Located in the oven chamber between said vertical reaches of the conveyor are vertically positioned transversely extending heating elements designated generally as 26 which elements comprise an important part of the present invention. These elements or units comprise an upper header 27 and a lower header 28, the lower header 23 being relatively close to the floor of the oven. Connecting the headers 27 and 28 are a plurality of ducts 29, the ducts 29 preferably comprising a series of spaced tubes as illustrated in Figure 2 but it will be understood that in lieu of using several tubes 29, other forms of communicating passageways may be provided between the headers 27 and 28. The headers 27, depending upon their position along the length of the oven, open at each end into one of the horizontal ducts 23 or 25. For example, the extreme right-hand header 27 as viewed in Figure 1 has its opposite ends opening into the forward ends of the ducts 23, while the next adjacent header 27 has its ends opening into the rear ends of the ducts 23. The header 27, at the extreme left as viewed in Figure 1, open at both ends into the rear ends of the ducts 25, and the remaining header, which is the header shown in Figure 2, opens at both ends into the forward ends of the horizontal ducts 25. The arrangement shown in Figure 2 is typical of the manner in which all of the cross headers 27 communicate at both ends with one or the other of the horizontal ducts. The arrangement is such that hot gases which are conducted into the boxlike structure 15a will flow down the ducts 22 and 24 from the interior of such structure into the horizontal passages 23 and 25 and from these passages hot gases will flow into the several headers 27 down the tubes or ducts 29 into the respective bottom headers 28. The box-like element 15a forms a partition under the horizontal reach of the conveyor, and provides a heating means for the passageway so formed. It is in this part of the oven that the dough entering the oven passes through an atmosphere of steam, the steam condensing on the relatively cold dough to give the desired quality to the crust, and heating means for heating from the bottom is advantageous in this zone. The box-like structure also serves in part to heat the upper portion of the main oven chamber below the horizontal reach of the conveyor, and in this capacity forms a large heat radiating surface. In order to cause the air in the oven chamber to be more rapidly heated, to secure a greater diffusion of heat, and in order to cause the air in the oven chamber to flow at a greater velocity over the heating tubes 29 and thereby more effectively and rapidly remove heat therefrom, I provide parallel baffle plates 30 and 31 as a part of each of the vertical heating units 26. These plates 30 and 31 terminate above the floor of the oven and their lower edges extend away from each other in order that air will more readily enter between the flue formed between these plates. The plates 30 and 31 are spaced from the tubes or ducts 29 as well as from the headers 27 and 28 so that an open flue space is provided between the two plates, but one in which the air is brought into intimate contact with the heating tubes 29. The plates 30 and 31 preferably flare outwardly at their top edges as illustrated in the drawings. Although they are shown terminating at a level about half way of the full height of the oven chamber, they may be carried to any desired height either higher or lower than that shown to meet the specific requirements of a given installation. Quite aside from their importance of providing flues, the baffle plates 30 and 31 have another important function. The pans of bread are usually set on the conveyor trays in side-by-side relation so that the ends of the bread pans move in paths which are closer to the vertical heater units than the centers of the pans. The baffle plates 30 and 31 serve to reduce the heat which reaches the ends of the pan by direct radiation from the ducts 29 thus preventing over-baking or burning of the ends of the loaves and also serving to equalize the temperature gradient across the oven so that those pans which happen to be in the direct line of the tubes or ducts 29 will not be heated more by direct radiation than would be the pans intermediate the ducts 29. Thus the plates 30 and 31 have two important functions, the first being to form flues whereby definite direction is given to the convective currents in the oven chamber and the atmosphere in the oven is caused to move at a higher velocity along the heated tubes 29 and also carry the cooler air from the floor of the oven into direct contact with the heated tubes. The second important function of these plates is to distribute heat which is radiated from the tube 29 so that the baking which is effected by direct radiation from the vertical heater elements is more uniform.

In order to provide bottom heat in the oven and assure of the loaves of bread being adequately baked at the bottom of the pans, other hot air ducts are provided at the floor of the oven chamber. One simple and preferred way of providing such bottom heat is to have the bottom headers 28 connected through longitudinally extending pipes or ducts. This is clearly shown in Figures 1 and 3 where a plurality of longitudinally extending pipes or ducts 32 carry gases from the header 28 at the right-hand end of the series to the first intermediate header 28. A second series of pipes 33, preferably of slightly larger capacity than the pipes 32, connect the two intermediate headers 28, and pipes 34 of still larger capacity connect the right-hand header 28 with the adjacent intermediate header, the intention being that the hot gases entering the several headers 28 will all flow toward the left-hand end of the oven as viewed in Figure 1. It will be understood that instead of a plurality of pipes at 32, 33 and 34, one or more relatively large flat sheet metal pipes may be employed. The hot gases flowing through the bottom ducts 32, 33 and 34 heat the air at the bottom of the oven by convection and also radiate heat vertically against the bottoms of the pans as the pans are carried up and down in the oven chamber.

My invention as described, provides vertically positioned transversely extending heating units disposed between some of the vertical reaches of the conveyor chain. It further provides an arrangement through which heat can be applied in the upper part of the oven above certain of the vertical reaches of the conveyor and, through the use of the element 15a, under a portion of the horizontal reach at the top of the oven. The invention also provides means for producing adequate bottom heat in the oven chamber.

While the hot gases which are circulated through the heating elements constituting the system herein described may be derived from any suitable or available source and forced circulation of such gases may be accomplished in any suitable manner, the invention is primarily intended for use where the gases of combustion are of a character which cannot be circulated directly through the oven chamber. In order that the possibility of leakage of such gases into the oven chamber may be minimized, I may, if desired, operate the heating system in such manner that a sub-atmospheric pressure exists in the vertical heating units 29 so that if leakage does occur, air will leak from the oven chamber into the gases of combustion, whereas if the system were a pressure system, the leakage would be from the vertical heating elements into the oven chamber. One form of apparatus for generating and circulating heated gases through the heating system is disclosed in the drawings, but it will be understood that this arrangement is described only for the purpose of illustration and that any suitable arrangement may be substituted.

In the arrangement shown in the drawings, the gases which enter the header 28 at the extreme left-hand end of the series of vertical heating units is carried through one or more ducts 35 to a header 36 which connects to the intake end 37 of a suction fan 38. This suction fan is illustrated as being located in the oven chamber and as having a driving shaft 39 which may be connected to a motor, not shown, outside the oven chamber. The fan 38 has its discharge duct 40 connected to a header 41. A series of pipes 42 extend from the header 41 under a firebox unit 43 into a mixing chamber 44. The ends of the pipes 42 are bent vertically upwardly and terminate in spaced relation to correspondingly centered vertical pipes 45, the lower ends of the pipes 45 opening into the mixing chamber 44. The upper ends of the pipes 45 open into a cross header 46. The arrangement is such that gases being discharged by the fan from the terminals of the pipes 42 at relatively high velocity will induce other gases from the mixing chamber 44 into the tubes 45. Hot gases of combustion are produced from any suitable burner in a combustion chamber 47. The gases of combustion generated in the combustion chamber 47 pass over a bridge wall along one side of the combustion chamber down a passageway 48 and through ports 49 into the bottom of the mixing chamber 44.

With the arrangement described, the high temperature gases coming from the combusion chamber are diluted by the gases which are being recirculated. Leading forwardly from the header 46 are one or more ducts 50 in the top of the oven. The duct 50 opens into downwardly extending passageways 51 formed in the two side walls of the oven, the lower ends of the passageways 51 opening through ports 52 into the hollow box-like structure 15a thus completing the closed hot gas circulating system. Opening into the duct 50 I have illustrated a flue 53 which leads to a chimney stack. It is provided with a counterweighted valve 53a of the type well known for such purposes, the valve being adjusted to remain closed until the pressure in the duct 52 exceeds a predetermined value when it forces the valve or damper 53a open allowing the excess gases to spill out of the system and to be carried away.

For controlling the flow of heat through the several vertical units 29 the two passages 23 are provided with fore and aft dampers 23a and 23b, and the two horizontal ducts 25 are provided with similar fore and aft dampers 25a and 25b. By properly setting these dampers, the flow of gases into any one of the vertical heating units may be controlled, and if the vertical heating units tend to heat unevenly crosswise of the oven, a correction can be made by shutting down the amount of hot gas supplied to the hotter side of the unit to be controlled and increasing the flow to the cooler side. Where the combustion chamber is built into one end of the oven as illustrated in Figure 1, it is of course formed of a heat insulating structure so that the direct transmission of heat through the walls of the combustion chamber to the oven is not too intense, and the possibility of this heat being irregular or spotty, crosswise of the oven, is prevented through the use of baffling means, such as the sheet metal screen 54. The tubes 45, being located in the oven space and being in the hottest part of the gas circulating system of course tend to heat the rear end of the oven and radiate heat to the trays which are passing adjacent these tubes. A vertical baffle plate 55 is therefore preferably placed in the oven in spaced relation to the pipes 45, the lower end of this plate being flared outwardly as indicated at 55a to permit the ready flow of air from the oven chamber into the flue space provided between the plate 55 and the end wall of the oven. The baffle plate 55 may have a horizontally disposed extension 56 at the top thereof under the horizontal flue or duct 50. A movable damper plate 57 may be provided to control the discharge of heated air from the flue so formed into the top of the oven chamber.

The structure 15—15a is illustrated as having depending transverse baffles 58 which may or may not be provided, as desired.

My invention as herein described provides an efficient means for using hot gases to indirectly heat a baking oven of the continuous conveyor type wherein the bread or other substance being baked is carried up and down in the oven chamber. As previously stated, an important factor in securing this result is the provision and construction of the vertical transversely extending heating units 25, and the effectiveness of these vertical heating units is complemented through the provision of the element 15a for providing the proper top heat as well as for heating the horizontal reach of the conveyor and the provision of the ducts 32, 33 and 34 for providing a bottom heat. It is contemplated in connection with the present invention that the heating effect of any particular parts of the heating elements of the oven may be varied to suit the requirements of a particular oven by the use of sheets of thermal insulation spread over those surfaces which otherwise emit too much heat. For example, if too much heat is given off the top of the plate 15 under the horizontal reach of the conveyor, this may be reduced by covering all or part of the sheet 51 with sheet asbestos or other heat insulating material as is well known to those skilled in the art.

While I have shown and particularly described one embodiment of my invention, it will be understood that various changes and modifications may be made in the particular construction shown within the contemplation of my invention and under the scope of the following claims.

I claim as my invention:

1. An oven construction comprising a closed oven chamber with a floor closing the bottom thereof having an endless conveyor therein arranged in vertically extending reaches, means extending crosswise of the oven chamber between certain of the vertical reaches of the conveyor forming vertical flues which open into the oven chamber near the floor thereof and terminate in the oven chamber below the top thereof, and heating means for inducing a circulation of the air in the chamber through said flues whereby air descending to a level adjacent the floor of the oven is forced up into said vertical flues, is heated and recirculated.

2. An oven construction comprising a closed oven chamber with a floor closing the bottom of the chamber having an endless conveyor therein arranged in vertically extending reaches, means extending crosswise of the oven chamber between certain of the vertical reaches of the conveyor forming vertical flues which open into the oven chamber near the floor thereof and terminate in the oven chamber below the top thereof, heating means in said flues, said heating means comprising heat transfer ducts through which hot gases may be circulated, and means for conducting hot gases to and from the ducts.

3. An oven construction comprising an enclosed oven chamber having an endless conveyor therein arranged in vertically extending reaches, means extending crosswise of the oven chamber between certain of the vertical reaches of the conveyor forming vertical flues which open into the oven chamber near the floor thereof and terminate in the oven chamber below the top thereof, heating means in said flues, said heating means comprising hot gas conducting headers adjacent the top and bottom of the flue, and ducts establishing communication between said headers, the end of the flues being flared at the top and bottom to provide adequate clearance for said headers.

4. The combination with a traveling tray oven comprising an enclosed chamber having a floor at the bottom thereof having a conveyor which conveyor travels throughout a considerable portion of its movement in a plurality of vertical reaches, of heaters located between certain of said vertical reaches comprising vertically disposed units extending crosswise of the oven through which hot gases may be circulated, and means forming a flue-like enclosure about said units, said means having its lower edge above but in close proximity to the oven floor and its upper edge below the uppermost part of the conveyor.

5. A traveling tray oven comprising an enclosed structure with a floor and of the type having a conveyor chain which moves through at least a portion of its travel in a plurality of vertical reaches in the space within said structure, means between certain vertical reaches of the conveyor extending crosswise of the oven forming vertical flues terminating below the top of the oven and above the floor of the oven, and heating units located in the flues.

6. The combination with an oven having a conveyor therein arranged to travel in an up and down path and having a horizontal reach across the top of the oven, of heating means for the oven comprising a thin flat duct below the horizontal reach of the conveyor having a width substantially co-extensive with the width of the oven and extending lengthwise over several of the up and down reaches of the conveyor and forming a horizontal partition in the oven space below said horizontal reach of the conveyor and above said vertical reaches, means for supplying hot gases to the interior of said thin flat duct, means for conducting hot gases from said duct, and secondary oven heating means between said vertical reaches of the conveyor into which said hot gases are conducted, and means for carrying away the spent gases from said secondary heating means.

7. An oven of the traveling tray type comprising an enclosed oven structure having an oven chamber therein, a conveyor in the chamber having a number of vertically extending reaches, means extending crosswise between certain reaches providing transversely extending vertical flues which flues open into the oven chamber at their bottoms and tops, means between said flues for inducing a circulation of air therethrough, and heating means adjacent the floor of the oven chamber.

8. An oven of the traveling tray type comprising an oven structure having an oven chamber therein, a conveyor in the chamber having a number of vertically extending reaches, means extending crosswise between some of the reaches providing transversely extending vertical flues which flues open into the oven chamber at their bottoms and tops, means between said flues for inducing a circulation of air therethrough, heating means adjacent the floor of the oven chamber, and other heating means in the upper portion of the oven chamber over some of said vertically extending reaches of the conveyor and above the tops of some of said flue-forming means.

9. An oven of the traveling tray type comprising an oven structure having an oven chamber therein, a conveyor in the chamber having a number of vertically extending reaches, means between some of the reaches providing transversely extending vertical flues opening into the oven chamber at their bottoms and tops, heat exchange means in said flues arranged for the circulation of heated gases therethrough for heating the air in said flues and inducing a circulation of air upwardly through the flues, other heat exchange units on the floor of the oven chamber, the heat exchange units on the floor and in the flues being in communication whereby the same heated gases flow in succession therethrough.

10. An oven of the traveling tray type comprising an oven structure having an oven chamber therein, a conveyor in the chamber having a number of vertically extending reaches, means between some of the reaches providing transversely extending vertical flues opening into the oven chamber at their bottoms and tops, heat exchange means in said flues arranged for the circulation of heated gases therethrough for heating the air in said flues and inducing a circulation of air upwardly through the flues, other heat exchange units on the floor of the oven chamber, the heat exchange units on the floor and in the flues being in communication whereby the same hot gases flow in succession therethrough, and means for maintaining the hot gases circulating through said heating means at a sub-atmospheric pressure.

11. The combination with an oven having a conveyor therein arranged to travel in an up and down path and also having a horizontal reach across the top of the interior of the oven, of a heating system comprising a thin flat duct below the horizontal reach of the conveyor and above certain of the up and down flights thereof and forming a partition below a portion of the horizontal reach of the conveyor, and means for circulating heated gases through said thin flat duct.

12. A traveling tray oven of the type having an oven chamber with a conveyor therein, the conveyor having a horizontal reach across the top of the oven and having vertical reaches under the horizontal one, a structure under the horizontal reach and above certain of the vertical reaches forming both a partition and a heater, said structure having a passageway therethrough through which hot gases may be circulated, a plurality of transverse flues in the oven space below said structure and opening into the oven space at their top and bottom, and heaters in said flues, the heaters being of a type through which hot gases may be circulated, said first heater in the structure below the horizontal reach of the conveyor and the heaters in said flues being included in a common hot gas circulating system.

13. In an oven, an enclosed oven chamber which has a floor at the bottom thereof and having an endless conveyor therein arranged with vertically extending reaches, means extending crosswise of the oven chamber between two of said vertical reaches of the conveyor forming a vertical flue crosswise of the oven chamber, said means terminating at its bottom above the oven floor and at its top below the top of the oven chamber, and means for inducing a circulation of the air in the oven chamber through said flue.

14. An oven construction comprising an oven chamber which has a floor at the bottom thereof and having an endless conveyor therein arranged with spaced vertical reaches, means extending crosswise of the oven between two of the vertical reaches of the conveyor forming a transverse vertical flue, said means terminating above the bottom and below the top of the oven chamber, and a heat transfer means through which hot gases may be circulated arranged to induce a circulation of air in the oven chamber upwardly through said means.

15. An oven of the traveling tray type having an endless conveyor which extends lengthwise along the top of the interior of the oven and which extends in up and down reaches within the oven chamber, a hot gas circulation duct in the oven chamber under the horizontal reach of the conveyor and over the top of some of the up and down reaches, said ducts extending the full width of the oven chamber so as to form a horizontal partition under the horizontal reach of the conveyor, said duct being arranged to supply heat to the portion of the oven above it and also to heat the part of the oven chamber under it, other means below said duct extending vertically between certain of the up and down reaches of the conveyor, and a common hot gas circulating system in which both said duct and said last named means are included.

SVEN J. HOLM.